United States Patent [19]

Hermann

[11] 4,039,496

[45] Aug. 2, 1977

[54] LOW FORMALDEHYDE FULLY ETHERIFIED METHYLOLATED MELAMINE WITH UREA-FORMALDEHYDE-GLYOXAL AS TEXTILE RESIN

[75] Inventor: David Trimble Hermann, Belle Mead, N.J.

[73] Assignee: American Cyanamid Company, Stamford, Conn.

[21] Appl. No.: 504,407

[22] Filed: Sept. 9, 1974

[51] Int. Cl.² .................... C08L 61/30; D06M 15/58
[52] U.S. Cl. .................................. 260/29.4 R; 8/183; 260/67.6 R; 260/849; 428/274
[58] Field of Search .......................... 260/29.4 R, 849

[56] References Cited

U.S. PATENT DOCUMENTS

| 3,211,805 | 10/1965 | Herbes et al. | 260/849 |
| 3,523,033 | 8/1970 | Verburg et al. | 260/849 |
| 3,590,100 | 6/1971 | Weiland | 260/849 |
| 3,639,096 | 2/1972 | Wright | 260/29.4 R |
| 3,723,377 | 3/1973 | Spangler | 260/29.4 R |
| 3,801,546 | 4/1974 | Petersen et al. | 260/29.4 R |
| 3,903,033 | 9/1975 | Chao | 260/29.4 R |

*Primary Examiner*—Murray Tillman
*Assistant Examiner*—A. H. Koeckert
*Attorney, Agent, or Firm*—H. G. Jackson

[57] ABSTRACT

The invention relates to a water soluble textile finishing resin composition, the process for preparing the same, the process for finishing textile materials therewith, and to the textile materials so treated. More particularly, the invention relates to infinitely water-soluble mixtures of substantially fully etherified substantially fully methylolated melamine resins and urea:formaldehyde:glyoxal reaction products which are characterized by having a low free formaldehyde content and excellent storage stability, to the method for preparing the same, to the process for treating textile materials therewith and to the textile materials so treated.

6 Claims, No Drawings

LOW FORMALDEHYDE FULLY ETHERIFIED METHYLOLATED MELAMINE WITH UREA-FORMALDEHYDE-GLYOXAL AS TEXTILE RESIN

BACKGROUND OF THE INVENTION

1. Field of the Invention

The invention pertains to improved textile finishes.

2. Description of the Prior Art

U.S. Pat. No. 3,211,805 discloses the preparation of mixtures of substantially fully methylolated melamine-ethylene urea-formaldehyde compositions characterized by high water solubility and excellent storage stability. However, these mixtures are not without deficiencies, particularly in the fact that they have 3-4% free formaldehyde content.

The presence of free formaldehyde in amounts of 3-4% based on the total weight of the product is undesirable since the amounts are sufficient to render the material commercially unattractive because of the noxious odors which are produced on heating textile materials treated therewith.

Stable mixtures of methylolated melamines, methylolated urea and glyoxal are disclosed by Sandler et al in Canadian Pat. No. 903,392. However, the Sandler disclosure does not relate to mixtures containing etherified melamine-formaldehyde resins. In particular this invention differs from the proces of Sandler et al in that the composition of this invention is subjected to acidic conditions, the pH being as low as 2.5 or lower.

Frequently, prior art refers to the reaction products as being highly stable and infinitely soluble in water. In practice, it has been found that by adhering to the conditions described in such disclosures many infinitely water-soluble melamine resins can be so prepared, as for example, trimethyl trimethylol melamine, tetramethyl pentamethylol melamine, and the like. However, it has been my experience that when these teachings are applied to the prepartion of mixtures containing a substantially fully etherified, substantially fully methylolated melamine, the resulting product does not possess the necessary degree of water solubility and stability for a good textile resin.

The reasons for the poor water solubility and stability of many prior art mixtures containing substantially fully etherified, substantially fully methylolated resins have been speculated upon in the art. A strong body of opinion supports the theory that these deficiencies are developed in the product when it is attempted to obtain full etherification because of the conditions employed.

In recent years the free formaldehyde content of aqueous solutions of methylol carbamates has been reduced by contacting the solution with a pyrollidone in the presence of caustic as disclosed in U.S. Pat. No. 3,749,751. However, the use of pyrollidone is expensive. Very often efforts to physically reduce the free formaldehyde content to an acceptable level, as by vacuum concentration to less than 3% based on total composition, impairs the solubility of the resin in water. Common methods of removing the excess formaldehyde such as by isolating the methylolated melamine are too costly.

SUMMARY OF THE INVENTION

The invention is a process for preparing a water-soluble textile finishing composition comprising reacting relative amounts of about 1.0 mole of melamine and from about 9.5 to 11.5 moles of formaldehyde at a pH of about 6.0 to 6.5 and a temperature of about 60° C. to 75° C., while concentrating under vacuum to form a reaction mixture of substantially fully methylolated melamine and formaldehyde, recovering from about 30 to 35% by weight of the reaction mixture as distillate over a period of about 2½ to 3 hours, etherifying the reaction mixture by reacting it in highly acidified alcohol at slightly elevated temperatures to obtain a mixture of substantially fully alkoxymethylated melamine resin and formaldehyde, reacting the mixture of substantially fully alkoxymethylated melamine and formaldehyde with from about 1.65 to 3.3 moles of urea per mole of malamine and from about 0.1 to 0.5 mole of glyoxal per mole of urea at a pH of about 6.0 to 6.5 and a temperature of 60° to 75° C. under vacuum over a period of about 1 to 2 hours to recover an amount of distillate which ranges from about 15 to 20% based on the total weight of the reaction mixture, reacting the mixture at a temperature of about 60° C. to 75° C. under atmospheric pressure for a period of about 2 to 3 hours to achieve a free formaldehyde content from about 0.75 to 3.5% and a solids content of from about 65% to 75% by weight of the mixture, cooling the reaction mixture to ambient temperatures, adding an acid-binding agent to make the mixture moderately alkaline, and diluting the mixture with water to obtain suitable free formaldehyde and solids content; the compositions obtained by the processes; and textile materials finished with the compositions.

DESCRIPTION OF THE PREFERRED EMBODIMENTS

The preferred resin compositions of this invention are mixtures of methylated methylol melamine, a urea-formaldehyde resin, and 1,3-bis(hydroxymethyl)-4,5-dihydroxy-2-imidazolidinone. The conversion of a portion of the latter compound allows a stable urea-formaldenhyde portion to be made in a formaldenhyde/urea ratio low enough to result in a product hving a low free formaldehyde content.

The resin compositions of this invention combine the performance properties of a low urea/melamine ratio resin with the lower cost of a high urea/melamine ratio resin and yet have a relatively low free formaldehyde content. For sake of definition resins of a "low urea/melamine ratio" are those in which the molar ratio is 1.0 or less. They can be made in such a way as to result in a resin with a low free formaldehyde content. However, these resins suffer from cost disadvantages and in many cases have a high level of polymeric material which stiffens fabrics to which they are applied. Resins having a "high urea/melamine ratio" are defined as those in which the molar ratio 1.5 or above. However, in order to achieve a stable product with such a resin an excess of formaldehyde must be used to gain a highly substituted urea. This results in a high level of free formaldehyde.

I have found that by converting a portion of the urea in situ to 1,3-bis(hydroxymethyl)-4,5-dihydroxy-2-imidazolidinone, a stable mixture can be made without the need for a large excess of formaldehyde.

The process of this invention is characterized by two operations involving distillations under vacuum. This process is referred to hereafter as the "double strip" process as opposed to a "single strip" process in which the second distilllation under vacuum is omitted. The "double strip" process results in the elimination of substantial amounts of excess free formaldehyde in the final product and has the additional advantage over the "single strip" process in that the final product is more stable to storage.

The substantially fully etherified, substantially fully methylolated melamine resin described herein may be prepared separately and employed in preparing the resinous finishing composition of this invention by chemically blending the product with the required amounts of 1,3-bis(hydroxymethyl) urea and 1,3-bis(hydroxymethyl)-4,5-dihydroxy-2-imidazolidinone, but such blending is objectionable process-wise as costs are increased or the product is unsatisfactory due to the presence of excess formaldehyde. Thus, in accordance with the present invention, the novel finishing compositions are preferably prepared in situ in accordance with a "one-kettle process". By employing this procedure the afore described shortcomings are overcome.

By the expression "substantially fully methylolated melamine" as it is used herein, is meant a product which contains a minmum of 5.2 moles of combined formaldehyde per mole of melamine and preferably up to 5.9 moles of combined formaldehyde per mole of malemine.

By the expression "substantially fully etherified" as it is employed herein is meant that at least 60% of the available methylol groups on the melamine have been reacted with alcohol.

The advantages of the present invention will become more apparent from the detailed description set forth herein below.

The product of this invention is preferably characterized as a reaction composition, referring to the fact that the product is prepared by the addition of urea and glyoxal to a melamine-formaldehyde condensate whereby the free formaldehyde present can react with the urea and a urea-glyoxal condensate to form methylol condensates.

The resinous composition of this invention is further chracterized by infinite solubility in water and excellent stability characteristics, even though the malamine component is a substantially fully etherified, substantially fully methylolated product, and is present in the mixture in substantial amounts.

More specifically in accordance with the present invention melamine and formaldehyde, as a 44% aqueous solution of formaldehyde which also contains 0.5% by weight of methanol, are reacted in relative mole ratios of from 1 to about 9.5 to 1 to 11.5, relatively, and preferably in mole ratios of 1 to 11.1 to 1 to 11.3, respectively, while heating under a vacuum of 20 to 29 inches of mercury to distillation. In these mole ratios, of formaldehyde is expressed as monomeric formaldehyde. These reactants are heated and distilled in a suitable reaction vessel at a pH of between 6.0 and 7.5, and preferably between 7.0 and 7.2 at a temperature of between 45° C. and 70° C., and preferably between 60° C. and 65° C. until 30% to 35% of the total weight of the starting material is collected as distillate over a period of 2.0 to 3.0 hours.

The expression "20 to 29 inches of mercury" as used herein refers to commercial dial gauge readings. In principle these readings are obtained as follows. A hollow tube is connected from an opening in the container, the vacuum in which it is to be measured, to the upper end of a vertical glass tube, the lower end of which is in a pot of mercury. As vacuum exhausts the air from the container and the glass tube, the atmospheric pressure forms mercury up to the tube. The height to which the mercury rises in the tube is the measure of the vacuum in the container, which in the present instance has been read in inches.

After the methylolation is contemplated the substantially fully methylolated melamine is etherified. This is accomplished by cooling the mixture to a temperature between 30 and 50° C., preferably between 35° and 45° C., and acidifying it with a solution of a suitable acid until the pH of the reaction mixture is reduced to a value below 3.0 and preferably to a value below 2.6. The reaction mixture is then adjusted to a temperature between 20° and 40° C., preferably between 25° and 35° C., and an alcohol is added thereto. The amount of alcohol added should be sufficient to make a total of between 5.3 and 8.0 moles, preferably between 7.8 and 8.0 moles per mole of melamine.

Thereafter, the pH of the reaction mixture is adjusted to a value of between 2.0 and 3.0 with a suitable acid and preferably to a value between 2.5 and 2.75, and the mixture is stirred at a temperature of between 25° C. and 40° C., preferably between 30° C. and 35° C., until complete alkylation is obtained. Thereafter, the pH of the reaction mixture is adjusted to between 7 and 9 with an alkaline material such as sodium hydroxide, potassium hydroxide, sodium carbonate, sodium bicarbonate and the like, and urea and glyoxal, as a 40% aqueous solution previously adjusted to pH 6.0 to 6.5, are added to the reaction mixture to combine with a major portion of free formaldehyde. About 1.8 moles to 2.5 moles of urea per mole of melamine, and about 0.10 mole to 0.50 mole of glyoxal per mole of urea are added; between 2.0 moles and 2.25 moles of urea per mole of melamine and 0.25 mole to 0.30 mole of glyoxal per mole of urea are preferred. The reaction mixture is then heated under vacuum to 60° C. to 75° C. and concentrated over a period of 1 to 1¼ hours until 12 to 20% of the total weight is removed as distillate. The vacuum is broken and the mixture is maintained at 60° C. to 75° C. and pH 6.0 to 6.5 by the dropwise addition of 50% aqueous sodium hydroxide thereto as required for an additional 1 to 3 hours, preferably 2 to 2½ hours and then cooled to room temperature. Thereafter, the pH of the reaction mixture is adjusted to a value of between 9.0 and 10.0, preferably between 9.5 and 10.0, with a suitable alkaline material and the solution is filtered. The product at this point has a solids content of about 65 to 75%, and a free formaldehyde content of about 1.5 to 2.5% by weight. The product is then diluted with water to obtain a final product which has a solids content of about 45 to 50% and a free formaldehyde content of about 1.0 to 2.0% by weight.

It will be seen that the above-defined process is basically or essentially a "one-pot" process in which the methylolation stage is carried out in an aqueous solution of formaldehyde while concentrating the solution under vacuum. By employing these components and under the above conditions, it becomes unnecessary to isolate the substantially fully methylolated melamine before etherification step. It should be noted that the very small amount of methanol present in the reaction medium during methylolation is not critical.

Although methanol is the preferred alcohol, employed in the present process, it is believed that other saturated aliphatic alcohols containing from 2 to 4 carbon atoms, such as ethanol, the propyl alcohols, the butyl alcohols or mixtures of these, can be employed with some measure of success.

Preparatory to the etherification of the substantially fully methylated melamine, the pH of the reaction mixture is adjusted to a pH value between 2.0 and 3.0 and preferably between 2.5 and 2.75. This may be accomplished by employing any of a number of suitable acids, as for example sulfuric, hydrochloric, nitric, phosphoric, oxalic and toluene sulfonic acids. Nitric acid is the preferred acid, particularly when sodium hydroxide is employed as the alkaline caralyst during methylolation, for reasons that will appear more clearly hereinafter.

The amount of acid employed not only determines the pH of the reaction mixture, but also largely influences the time required to achieve complete etherification. In general, longer reaction times are required when minimum amounts of acid are employed and conversely shorter reaction periods are required when maximum amounts of acid catalysts are employed.

As indicated hereinabove, the amount of acid catalyst added is an amount sufficient to adjust the pH to a value between 2.0 and 3.0 and preferably between 2.5 and 2.75. Defined as moles of total acid per mole of melamine, the amount of acid employed should be from between about 0.10 and 0.20 per mole of melamine and preferably from between 0.14 and 0.18 per mole of melamine.

The mixture of formaldehyde, substantially fully etherified substantially fully methylolated melamine, urea and glyoxal is concentrated in order to remove excess methanol, water, and some of the free formaldehyde, by employing known vacuum concentration techniques. Experience has shown that the temperature of the reacction product should be about 60° to 75° C. employing a vacuum from 20 to 29 inches of mercury during the final concentration.

In accordance with the present process, the substantially fully methylated melamine is concentrated in order to remove excess free formaldehyde and water. This concentration is never such as will adversely affect the solubility of the product nor reduce the free formaldehyde content to an extent such that the urea added cannot be fully converted to 1,3-bis(hydroxymethyl)urea and 1,3-bis(hydroxymethyl)-4,5-dihydroxy-2-imidaxolidinone. In this connection, at the time of the addition of urea and glyoxal the concentrated methylolated melamine reaction product may contain as high as about 25% free formaldehyde based on the weight of the total reaction mixture, though preferably much less, but an amount sufficient to fully methylolate any urea and 4,5-dinydroxy-2-imidazolidinone. After the methylolation of the urea and 4,5-dihydroxy-2-imidazolidinone, the reaction mixture nornally will contain from traces of formaldehyde to a mixture of about 2%, based on the weight of the total reaction mixture.

By the expression "excellent stability" and similar expressions as they are employed herein, it is meant stability in aqueous solution in all concentrations for at least two weeks at 0° to 50°.

By the expression "infinite solubility" as it and similar expressions are employed herein, it is meant that the present resin composition is readily and easily soluble and dilutable in water in all proportions and that solutions containing the resin in all proportions remain clear.

The resin composition of this invention is applied to textile materials and preferably textile materials containing at least 20% cellulose, in order to impart shrinkage control and a high degree of wrinkle resistance thereto, without discoloration due to chlorine retention from repeated chlorine-containing washings and minimum loss of tensile strength also due to chlorine retention.

By the term "cellulosic material" as that term is employed herein, it is meant fibers, yarns, filaments, formed fabric, whether woven or non-woven, felted or otherwise formed, containing at least 20% of cellulose fiber prepared from cotton, rayon, linen, flax and other cellulosic materials. These cellulosic textile materials may be employed in combination with other non-cellulosic materials, as for example, they may be blended with other natural or synthetic fibers, as for example, wool, nylon, acrylic and polyester fibers, and the like.

The following examples are presented wherein unless otherwise specified, parts and percentages are on a weight basis. The examples are not be be construed as limitations on the invention.

EXAMPLE 1

To a three-neck flask equipped with a condensor and receiver for vacuum distillation and a heating mantle is added 408.0 g. (5.95 m.) of 44% aqueous formaldehyde, the pH of which is adjusted to 7.4.

To the aqueous formaldehyde solution is added 67.2 g. (0.53 m.) of melamine and the reaction mixture is heated at 65° C. under vacuum to collect 148.7 g. of distillate over a period of 2 hours and 36 minutes. The reaction mixture is then cooled to 40° C. and a solution of 1.0 g. of 70% nitric acid in 10.0 g. of methanol is added to the reaction mixture. The reaction mixture is then cooled to 30° C. and 125.0 g. of methanol is added thereto followed by the addition of 7.5 g. of 70% nitric acid to adjust the pH to 2.5–2.6 and the mixture is maintained at 30° C. for 20 minutes. The pH is then adjusted to 8.0 by the addition thereto of sodium hydroxide.

To the reaction mixture is added 65.4 g. (1.09 m.) of urea and 39.6 g. (0.27 m.) of a 40% aqueous solution of glyoxal, and heat and vacuum (18.5 inch) are applied to the system. The mixture is heated to 65° C. and concentrated to remove 82.0 g. of distillate over a period of 1 hour and 10 minutes. The vacuum is then broken and the reaction mixture is divided into two portions, one portion being reserved for Example 2.

The pH of one portion of the reaction mixture is adjusted to and maintained at 6.0–6.5 by the addition of sodium hydroxide while the temperature is maintained at 65° C. for an additional hour. At the end of this time the pH is adjusted to 9.0 by the addition of sodium hydroxide and the mixture is cooled to room temperature to obtain 187.8 g. of product which is then diluted with water to a final product having 1.4% free formaldehyde and 45% solids content.

EXAMPLE 1 (a)

This example demonstrates that without the second vacuum concentration the final product has a high free formaldehyde content.

To a three-neck flask equipped with a condensor for vacuum distillation and a heating mantle is added 1320.0 g. (19.34) of 44% aqueous formaldehyde, the pH of which is adjusted to 7.0.

To the aqueous formaldehyde solution is added 218.0 g. (1.73 m.) of melamine and the reaction mixture is heated at 65° C. under vacuum to collect 511.0 g. of distillate over a period of 3 hours. The reaction mixture is then cooled to 40° C. and a solution of 2.0 g. of 70% nitric acid in 20.0 g. of methanol is added to the reaction mixture. The reaction mixture is then cooled to 30° C. and 415.6 g. of methanol is added thereto followed by the addition of 20.6 g. of 70% nitric acid and the mixture is maintained at 30° C. for 20 minutes. The pH of the mixture is then adjusted to 8.5 by the addition thereto of sodium hydroxide. At this point the reaction mixture weighted 1458 g. and had a free formaldehyde content of 18.0%. This mixture is called "Part A".

To 450 g. of "Part A" is added 65.4 g. of urea (1.09 m.) and 39.6 g. (0.27 m.) of a 40% aqueous solution of glyoxal, the pH is adjusted to 6.0-6.5 by the addition thereto of 70% nitric acid, and the mixture is heated at 60° C. for a period of 3 hours while maintaining the pH at 6.0-6.5. At the end of this time the product is diluted with 119 g. of water to obtain 662 g. of product having a solids content of 50% and a free formaldehyde content of 3.5%.

EXAMPLE 1 (b)

This example demonstrates that introduction of the second vacuum concentration results in a final product having a much lower free formaldehyde content.

The procedure of Example 1(a) is followed up to the preparation of "Part A". To 230 g. of "Part A" is added 33.4 g. (0.556 m.) of urea and 20.2 g. (0.139 m.) of a 40% aqueous solution of glyoxal, the pH of the mixture is adjusted to 6.5 by the addition of 70% nitric acid and heat and vacuum are applied to the system. The mixture is concentrated at 40°-50° C. to remove 59 g. of distillate over a period of 1 hour. The vacuum is then broken and the mixture is heated to 65° C. and the pH is maintained at 6.4-6.5 by occasional addition of sodium hydroxide while the temperature is maintained at 65° C. for an additional 2 hours. At the end of this period the mixture is cooled to room temperature and the pH is adjusted to 8.5 by adding sodium hydroxide to obtain 253.5 g. of product which is then diluted with 70 g. of water to obtain a final product having a solids content of 50% and a free formaldehyde content of 1.2%.

EXAMPLE 1 (c)

This example demonstrates the influence of final pH on the storage stability of the final product.

To a three-neck flask equipped with a condenser for vacuum distillation and a heating mantle is added 408 g. (5.98 m.) of 44% aqueous formaldehyde, the pH of which is adjusted to 7.2.

To the aqueous formaldehyde solution is added 67.2 g (0.53 m.) of melamine and the reaction mixture is heated under vacuum to collect 161 g. of distillate over a period of three hours. The reaction mixture is cooled to 40° C. and a solution of 1.0 g. of 70% nitric acid in 10.0 g of methanol is added thereto. The reaction mixture is then cooled to 30° C. and 125 g. of methanol is added thereto followed by the addition of 7.0 g. of 70% nitric acid to adjust the pH to 2.0 and the mixture is maintained at 30° C. for 20 minutes. The pH of the reaction mixture is then adjusted to 7-9 by adding sodium hydroxide and 65.4 g. (1.09 m.) of urea and 39.6 g. (0.27 m.) of 40% aqueous glyoxal solution are added. The pH is then adjusted to 6.2 by addition of 70% ntiric acid and the mixture is vacuum concentrated (27 inch of mercury) to collect 84 g. of distillate over a period of 1 hour. The vacuum is then broken and the mixture is heated at 65° C. for a period of 2 hours. The mixture is then cooled to room temperature, the pH is adjusted to 8.5 by adding sodium hyroxide and the product is diluted with 45 g. of water to obtain 145 g. of final product having a solids content of 50% and a free formaldehyde content of 1.4%. Samples of the final product were then adjusted to pH 7.5, 8.7 and 9.6 respectively, by the addition of 70% nitric acid or sodium hydroxide as required, and the samples were stored at 0° C. and 50° C. to determine their storage stabilities. The results obtained are given in Table I.

TABLE I

| pH of Sample | OBSERVATIONS AT | |
|---|---|---|
| | 0° C. | 50° C. |
| 7.5 | Precipitates after 13 days | Hydrophobes after 5 days |
| 8.7 | Cloudy after 13 days | Hydrophobes after 9 days |
| 9.6 | Clear after 18 days | Clear after 18 days |

EXAMPLE 1 (d)

Examples 1(d) and 1(e) illustrate that without the second vacuum concentration the final product is unstable to storage at 50° C.

To a three-neck flask equipped with a condensor and receiver for vacuum distillation and a heating mantle is added 660.0 g. (9.6 m.) of 44% aqueous formaldehyde, the pH of which is adjusted to 6.0 by the dropwise addition of 50% aqueous sodium hydroxide.

To the aqueous formaldehyde solution is added 110.0 g. (0.87 m.) of melamine and the reaction mixture is heated at 45° C. under a vacuum of 27 inch of mercury to collect 242.7 g. of distillate over a period of 3 hours. The reaction mixture is then cooled to 40° C. and a solution of 1.0 g. of 70% nitric acid in 10.0 g. of methanol is added thereto. The reaction mixture is then cooled to 30° C. and 207.8 g. of methanol is added thereto followed by the addition of 10.2 g. of 70% nitric acid and the mixture is divided into two equal parts each weighing 373.5 g.

To one part of the reaction mixture is added 71.0 g. (1.18 m.) of urea and 85.6 g. (0.59 m.) of a 40% aqueous solution of glyoxal, and the pH is adjusted to 6.5 by the dropwise addition of 70% nitric acid. The mixture is then heated to 60° C and maintined at 60° C. for a period of 3 hours. It is then cooled to room temperature and diluted with water to obtain a clear product having 50% solids, 1.9% free formaldehyde and a pH of 9.0. This material hydrophobed after storage at 50° C. for 9 days.

EXAMPLE 1 (e)

To the second part of the reaction mixture from Example 1 (d) is added 71.0 g. (1.18 m.) of urea and 85.6 g. (0.59 m.) of a 40% aqueous solution of glyoxal, the pH is adjusted to 6.5 by the addition of 70% nitric acid, and heat and vacuum (21 inches) are applied to the system. The mixture is heated to 60° C and concentrated to remove 72 g. of distillate over a period of 1 hour and 15 minutes. The vacuum is then broken and the reaction mixture is cooled to room temperature and diluted with water to obtain a clear final product having 50% solids, 1.2% free formaldehyde and a pH of 9.0. This material remains clear after storage at 50° C. for 14 days.

EXAMPLE 2

The other portion of the material from Example 1 is adjusted to pH 9.0 by the addition of sodium hydroxide thereto, and held at 65° C. and pH 9.0 for 1 hour. The product (283 g.) is cooled to room temperature and diluted with water to a final product having a solids content of 45% and a free formaldehyde content of 1.5%.

EXAMPLE 3

To a three-neck flask equipped as in Example 1 is added 816.0 g. (11.9 m.) of a 44% aqueous solution of formaldehyde, the pH of which is adjusted to 7.2. To the aqueous formaldehyde solution is added 134.4 g. (1.06 m.) of melamine and the reaction mixture is heated under vacuum to collect 308.7 g. of distillate over a period of 2 hours and 35 minutes. The mixture is then cooled to 40° C. and a solution of 2.0 g. of 70% nitric acid and 20.0 g. of methanol is added thereto. The mixture is cooled to 30° C. and 250.0 g. of methanol and 17.5 g. of 70% nitric acid are added and the reaction mixture (pH 2.5) is maintained at 30° C. for 20 minutes. The pH of the reaction mixture is then adjusted to 10.5 by the addition of 20.0 g. of sodium hydroxide. To 150.0 g. of the reaction mixture is added 22.4 g. (0.37 m.) of urea and 15.5 g. (0.11 m.) of 40% of aqueous solution of glyoxal, the pH is adjusted to 6.5 by the addition of 70% nitric acid and heat and vacuum are applied to the system. The mixture is heated at 65° C and concentrated to remove 27.7 g. of distillate over a period of 50 minutes. The vacuum is then broken and the pH is adjusted to 6.0–6.5 and heating is continued at 65° C. for an additional 2 hours and 10 minutes without vacuum. The pH of the product (155.6 g.) is adjusted to 9.0, the product is cooled to room temperature and diluted with water to obtain 240.5 g. of final product having a solids content of 45% and a free formaldehyde content of 1.1%.

EXAMPLE 4

The procedure of Example 3 is used up to the addition of urea and glyoxal to the reaction mixture. To 150.0 g. of the reaction mixture is added 23.4 g (0.39 m.) of urea and 14.0 g. (0.10 m.) of a 40% aqueous solution of glyoxal. The pH of the reaction mixture is adjusted to 6.4 by the addition thereto of 40% nitric acid and and vacuum and heat are applied to the system. The reaction mixture is heated at 65° C. and concentrated over a period of 45 minutes to remove 35.4 g. of distillate and obtain 148.4 g. of product, the pH of which is then adjusted to 6.0–6.5. The reaction mixture is maintained at 65° C. and pH 6.0–6.5 without vacuum for an additional 2 hours and 15 minutes. The pH of the mixture is then adjusted to 9.5 by the addition of sodium hydroxide and the mixture is reduced to room temperature to obtain 148.2 g. of product. The product is then diluted with water to obtain 242.0 g. of final product having a solids content of 45% and a free formaldehyde of 1.0%.

EXAMPLE 5

The procedure of Example 3 is used up to the addition of urea and glyoxal to the reaction mixture. To 150.0 g. of the reaction mixture is added 21.3 g. (0.35 m.) of urea and 12.8 g. (0.088 m.) of a 40% aqueous solution of glyoxal. The pH of the mixture is adjusted to 6.5 by the addition thereto of 70% nitric acid and heat and vacuum (21 inches) are applied to the system. The mixture is then concentrated at 65° C. to remove about 29 g. of distillate over a period of 30 minutes. The vacuum is broken and the pH of the reaction mixture is adjusted to 6.0–6.5 and the mixture is maintained at 65° C. for an additional 2 ½ hours. The pH of the mixture is then adjusted to 9.0 by the addition of sodium hydroxide and the temperature is lowered to room temperature. There is obtained 152.6 g. of product which is diluted with water to obtain 236.0 g. of final product having a free formaldehyde content of 1.5% and a solids content of 45%.

EXAMPLE 6

The following example is another "single strip" preparation.

To a three-neck flask equipped as in Example 1 is added 330.0 g. (4.82 m.) of a 44% aqueous solution of formaldehyde the pH of which is adjusted to 6.5. To the aqueous formaldehyde solution is added 54.9 g. (0.43 m.) of melamine and the reaction mixture (pH 7.5) is heated under vacuum to collect 115.5 g. of distillate over a period of 3 hours. The mixture is then cooled to 40° C. and a solution of 0.5 g. of 70% nitric acid in 5.0 g. of methanol is added to the reaction mixture. The reaction mixture is cooled to 30° C, 103.9 g. of methanol or 5.1 g. of 70% nitric acid are added thereto and the mixture is maintained at 30° C. for 20 minutes. The reaction mixture is then made alkaline by the addition of 5.0 g. of sodium hydroxide.

To 376.0 g. of the reaction mixture is added 71.0 g. (1.18 m.) of urea and 85.6 g. (0.59m.) of a 40% aqueous solution of glyoxal. The pH of the reaction mixture is then adjusted to 6.5 and the reaction is maintained at 60° C. for 3 hours and then cooled to room temperature. The product is diluted with water to obtain a final product having a free formaldehyde content of 0.5% and a solids content of 50%.

EXAMPLES 7-10

Samples of the final products of Examples 1, 3, 5 and 6 were stored at 50° C. and examined periodically to determine whether or not the solution hydrophobes, that is whether or not it separates into 2 phases. The results shown in Table I show that the products from Examples 1, 3, and 5 prepared by the process of this invention are more stable than the product of Example 6 prepared by the "single strip" process.

TABLE I

| Example | Product From Example No. | Observations |
|---------|--------------------------|--------------|
| 7 | 1 | Sample stable up to 27 days |
| 8 | 3 | Sample stable up to 27 days |
| 9 | 5 | Sample stable up to 34 days |
| 10 | 6 | Sample stable up to 12 days |

EXAMPLES 11-34

Six aqueous pad baths were prepared, the respective baths containing 10.0% by weight of the final products of Examples 1-5 and a standard commercial resin which has 3.5-4.0% free formaldehyde, 1.6-1.8% by weight of magnesium chloride, and 0.1% by weight of a nonionic surfactant (Deceresol Surfactant N.I. conc.). The pad baths were applied to 80 × 80 cotton broad cloth and rayon gaberdine by standard padding procedures to obtain wet pickups of 82 and 89% respectively. The treated fabrics were dried at 225° F. (the rayon fabrics were dried and framed to size), and cured for 1 minute at 350° F. and 2.5 minutes at 325° F. respectively. The cotton fabrics were evaluated for wrinkle recovery and chlorine retention while the rayon gaberdine fabrics were evaluated for shrinkage control. The results in Tables II–V show the following.:

The wrinkle recovery and chlorine retention results obtained with the product of this invention are equivalent to the results obtained with the standard commercial resin which has a much higher free formaldehyde content. No discoloration was found on any treated cotton after scorching for 30 seconds at 365° F. initially and after 5 washes at 140° F.

When the treated cotton fabric was subjected to a bleach test under severe and moderate conditions the fabric treated with the standard resin showed more yellowing than similar fabrics treated with the products of this invention.

The hands of all fabrics treated with the products of this invention were equivalent to the hand of fabrics treated with the standard sample.

TABLE II
WRINKLE RECOVERY TEST
80 × 30 Cotton
Wrinkle Recovery of Fabrics: Recovery Angle Method (a)

| Ex. No. | Product From Example Number | Crease Recovery Angle (degrees) | | | | | |
|---|---|---|---|---|---|---|---|
| | | Initial | | | After 5 Washes (b) | | |
| | | Warp | Fill | Total | Warp | Fill | Total |
| 11 | 1 | 139 | 135 | 274 | 141 | 134 | 275 |
| 12 | 2 | 148 | 140 | 288 | 138 | 129 | 267 |
| 13 | 3 | 137 | 132 | 269 | 140 | 134 | 274 |
| 14 | 4 | 138 | 133 | 271 | 135 | 125 | 260 |
| 15 | 5 | 140 | 128 | 268 | 129 | 123 | 252 |
| 16 | Standard | 142 | 135 | 277 | 137 | 137 | 274 |
| | Untreated | 108 | 97 | 205 | 99 | 101 | 200 |

(a) American Association of Textile Chemists and Colorists (AATCC) Test Method 66-1972.
(b) Normal cycle, 140° F., high setting, 4-lb. load, 90 grams Dash, 230, cc Clorox. Tumble dried after last wash.

TABLE III
Chlorine Retention Test

| Example Number | Product From Example Number | Tensile Strength (lb.) Scott Tensile Strength Tester Grab Tensile | | 80 × 80 Cotton Chlorine, Retained, Tensile Loss: Single Sample Method (a) Scott Grab Tensile Strength (lbs.) Warp Washes* | | |
|---|---|---|---|---|---|---|
| | | Warp | Fill | Chlori-nated | Chlorinated Scorched | % Loss |
| 17 | 1 | 34 | 23 | 35 | 24 | 2.9 |
| 18 | 2 | 31 | 19 | 35 | 34 | 2.9 |
| 19 | 3 | 37 | 22 | 35 | 35 | 0 |
| 20 | 4 | 38 | 24 | 37 | 34 | 8.1 |
| 21 | 5 | 39 | 23 | 35 | 35 | 0 |
| 22 | Standard | 37 | 19 | 36 | 36 | 0 |
| | Untreated | 54 | 42 | 49 | 48 | 2 |

(a) AATCC Test Method 92-1971

TABLE IV
SHRINKAGE CONTROL ON RAYON GABARDINE (a)

| Example Number | Product From Example Number | % Shrinkage | | | |
|---|---|---|---|---|---|
| | | After 1 Wash (b) | | After 5 Washes (b) | |
| | | Warp | Fill | Warp | Fill |
| 23 | 1 | 2.0 | 0.3+ | 2.8 | 0.1+ |
| 24 | 2 | 1.3 | 1.0+ | 2.2 | 1.5+ |
| 25 | 3 | 2.3 | 0.8+ | 2.0 | 1.8+ |
| 26 | 4 | 2.1 | 1.0+ | 1.7 | 1.7+ |
| 27 | 5 | 1.8 | 0.5+ | 1.8 | 1.2+ |
| 28 | Standard | 1.5 | 0.6+ | 2.0 | 0.1+ |
| | Untreated | 10.0 | 1.0+ | 10.2 | 1.5+ |

(a) AATCC Test Method 135-1970
(b) Normal cycle, 140° F., high setting, 4-lb. load, 35 grams Dash, in soft water, press dried after each wash.

TABLE V

| Example Number | Product of Example Number | Hand | | Oxalic Acid Bleach Test (a) |
|---|---|---|---|---|
| | | Rayon | Cotton | |
| 29 | 1 | Same as Std. | Same as Std. | Less yellowing than control |
| 30 | 2 | " | " | " |
| 31 | 3 | " | " | " |
| 32 | 4 | " | " | " |
| 33 | 5 | " | " | " |
| 34 | Standard | Same as Std. | Same as Std. | Yellowing |
| | Untreated | Firmer than Standard | Firmer than Standard | No Yellowing |

(a) AATCC Test Method 92-1971 modified by a preliminary wash of the treated textile material in a 2% aqueous solution of oxalic acid at 100° F. for 10 minutes.

Examples 35-40

Three aqueous pad baths are prepared containing 10.6% by weight of the products of Examples 3 and 4 respectively, and a standard commercial resin which has a free formaldehyde content of 3.5-4.0%, 5% by weight of a commercial water repellent fluorochemical extender (Aerotex Water Repellent 96), 2.5% of a commercial fluorochemical oil repellent (Scotchgard FC-210), and 2.5% of an aqueous solution of 24% by weight of zinc nitrate and 1.4% acetic acid. The pad baths are applied to 100% cotton poplin and 50/50 polyester/cotton fabric by standard padding procedures to obtain wet pickups of 62% and 58% respectively, based on the weight of untreated fabric. The treated fabrics are dried for 2 minutes at 225° F, cured for 2 minutes at 350° F. and evaluated for water and oil repellency initially, after 5 washes, and after one dry cleaning. The water and oil repellencies of the fabrics treated with the products of Examples 3 and 4 were found to be equivalent to those obtained with the standard resin. The results as shown in Tables VI and VII demonstrate that equivalent water and oil repellencies are obtained with the products of this invention when compared to the standard resin which has a much higher free formaldehyde content.

TABLE VI
WATER REPELLENCY: SPRAY TEST (a)

| Ex. No. | Product From Example | Initial A(b) | Initial B(c) | After 5 Washes (d) A | After 5 Washes (d) B | After 1 Dry Cleaning (e) A | After 1 Dry Cleaning (e) B |
|---|---|---|---|---|---|---|---|
| 35 | 3 | 100 | 100 | 70 | 80 | 80 | 90 |
| 36 | 4 | 100 | 100 | 70 | 80 | 80 | 90 |
| 37 | Standard | 100 | 100 | 70 | 80 | 80 | 90 |

(a) AATCC Test Method 22-1971
(b) A = 100% Cotton Poplin
(c) B = 50/50 Polyester/Cotton
(d) Kenmore washes, normal cycle, 140° F. high setting, 4-lb. load, 28 grams of Tide, pressed after last wash.
(e) Dry cleaned using perchloroethylene and Street's Formula 886, centrifuged. Pressed dried.

TABLE VII
OIL REPELLENCY TEST (a)

| Ex. No. | Product From Example | Initial A (b) | Initial B (c) | After 5 Washes (d) A | After 5 Washes (d) B | After 1 Dry Cleaning (e) A | After 1 Dry Cleaning (e) B |
|---|---|---|---|---|---|---|---|
| 38 | 3 | 4 | 5 | 2 | 5 | 4 | 5 |
| 39 | 4 | 4 | 5 | 2 | 4 | 4 | 5 |
| 40 | Standard | 4 | 5 | 2 | 4 | 4 | 5 |

(a) AATCC Test Method 118-1972
(b) A = 100% Cotton Poplin
(c) B = 50/50 Polyester/Cotton
(d) Kenmore washes, normal cycle, 140° F, high setting, 4-lb. load, 28 grams of Tide, pressed after last wash.
(e) Dry cleaned using perchloroethylene and Street's Formula 886, centrifuged. Pressed dried.

Examples 41–43

Three aqueous pad baths are prepared containing 10.0% of the products of Examples 3 and 4 and a standard commercial resin, 36% of a commercial fire retardant, which is 80% by weight of an organophosphorus composition, 3% of phosphoric acid, 2.5% of a commercial softener and 0.05% of a nonionic surfactant. The pad baths are applied to 100% cotton sheeting by standard padding procedures to obtain a wet pickup of 90% based on the weight of the untreated fabric. The treated fabrics are dried 2 minutes at 225° F. and cured for 1.5 minutes at 320° F. and then evaluated for fire retardancy after 15, 25, and 50 washes. The results in Table VIII show that the fire retardancies of fabrics treated with the products of this invention are equivalent to that obtained with fabrics treated with the standard resin up to 15 washes, but inferior after 25 and 50 washes.

TABLE VIII
FLAMMABILITY TEST (a)

| Ex. | Product From Example | Char Length (in.) After 15 Washes (b) | After 25 Washes (b) | After 50 Washes (b) |
|---|---|---|---|---|
| 41 | 3 | 2.6 | 3.8 | 5.5 |
| 42 | 4 | 2.9 | 3.6 | 3.0 |
| 43 | Standard | 2.5 | 2.6 | 3.2 |

(a) Department of Commerce Flammability Test FF 3-71
(b) Kenmore washes, normal cycle, 140° F, high setting, 4 lb. load, 28 grams of Tide, pressed after last wash.

I claim:

1. A process for preparing a water-soluble textile finishing composition comprising
   reacting relative amounts of about 1.0 mole of melamine and from about 9.5 to 11.5 moles of formaldehyde at a pH of about 6.0 to 6.5 and a temperature of about 60° C. to 75° C., while
   concentrating under vacuum to form a reaction mixture of substantially fully methylolated melamine and formaldehyde,
   recovering from about 30 to 35% by weight of the reaction mixture as distillate over a period of about 2½ to 3 hours,
   etherifying the reaction mixture by reacting it in highly acidified alcohol at slightly elevated temperatures to obtain a mixture of substantially fully alkoxymethylated melamine resin and formaldehyde,
   reacting the mixture of substantially fully alkoxymethylated melamine and formaldehyde with from about 1.65 to 3.3 moles of urea per mole of melamine and from about 0.1 to 0.5 mole of glyoxal per mole of urea at a pH of about 6.0 to 6.5 and a temperature of 60° to 75° C. under vacuum over a period of about 1 to 2 hours to recover an amount of distillate which ranges from about 15 to 20% based on the total weight of the reaction mixture,
   reacting the mixture at a temperature of about 60° C. to 75° C. under atmospheric pressure for a period of about 2 to 3 hours to achieve a free formaldehyde content from about 0.75 to 3.5% and a solids content of from about 65% to 75% by weight of the mixture,
   cooling the reaction mixture to ambient temperatures,
   adding an acid-binding agent to make the mixture moderately alkaline, and
   diluting the mixture with water to obtain suitable free formaldehyde and solids content.

2. A process according to claim 1 wherein the acidified alcohol is methanol acidified with nitric acid and the etherification is conducted at a pH of about 2.0 to 3.0 and a temperature of about 25° C. to 35° C. for a period of about 15 to 30 minutes using about 5.3 to 8.0 moles of methanol per mole of melamine to obtain a substantially fully methoxymethylated melamine, the acid-binding agent is sodium hydroxide to adjust the pH of the mixture to about 9.5 to 10 and a free formaldehyde content of from about 0.5% to 2.0% and a solids content of from about 40% to 50% based on the weight of the mixture are obtained in the final diluting step.

3. A process for preparing a watersoluble textile finishing composition according to claim 2 comprising
   reacting in a suitable vessel relative amounts of 1.0 mole of melamine and 11.0 to 11.3 moles of formaldehyde as an aqueous solution at a pH of 6.0 to 6.2 while
   concentrating under vacuum to recover from 30 to 35% of the weight of the reaction mixture as distillate over a period of 2½ to 3 hours,
   breaking the vacuum and
   cooling the reaction mixture to between 28° C. and 40° C;
   acidifying the reaction mixture to adjust the pH to between 1.5 and 2.5;
   adding to the reaction mixture from 7.0 to 8.0 moles of methanol per mole of melamine used,
   maintaining the reaction mixture at 28° C. to 32° C. for a period of 15 to 25 minutes,
   adding aqueous sodium hydroxide to the reaction mixture to adjust the pH between 8.0 and 8.5, adding to the reaction mixture from 2.0 to 2.25 moles of urea per mole of melamine used, and between 0.1 and 0.3 mole of glyoxal per mole of urea used, adding 70% nitric acid to the mixture to adjust the pH to between 6.0 and 6.5, further concentrating the reaction mixture under vacuum at a temperature between 60° C. and 75° C. for a period of 1.0 to 1.5 hours to recover an amount of distillate which ranges from 15% to 20% based on the total weight of the reaction mixture, breaking the vacuum and further reacting the mixture at a temperature of 60° to 75° C. and a pH from 6.0 to 6.5 for a period of 1.5 to 2.0 hours to achieve a free formaldehyde content from 1.5 to 2.5% and a solids content of 65.0 to 75.0% based on the weight of the reaction mixture, cooling the reaction mixture to 25° to 30° C., adding aqueous sodium hydroxide thereto to adjust the pH to from 9.5 to 10.0 and adding water thereto to adjust the solids content to 45 to 50%.

4. A water-soluble, stable textile finishing composition prepared according to the process of claim 1.

5. A water-soluble, stable textile finishing composition prepared according to the process of claim 2.

6. A water-soluble stable textile finishing composition prepared according to the process of claim 3.

* * * * *